Feb. 13, 1940. C. PLEYDELL-BOUVERIE ET AL 2,190,548
CATALYTIC APPARATUS
Filed July 23, 1936 3 Sheets—Sheet 1
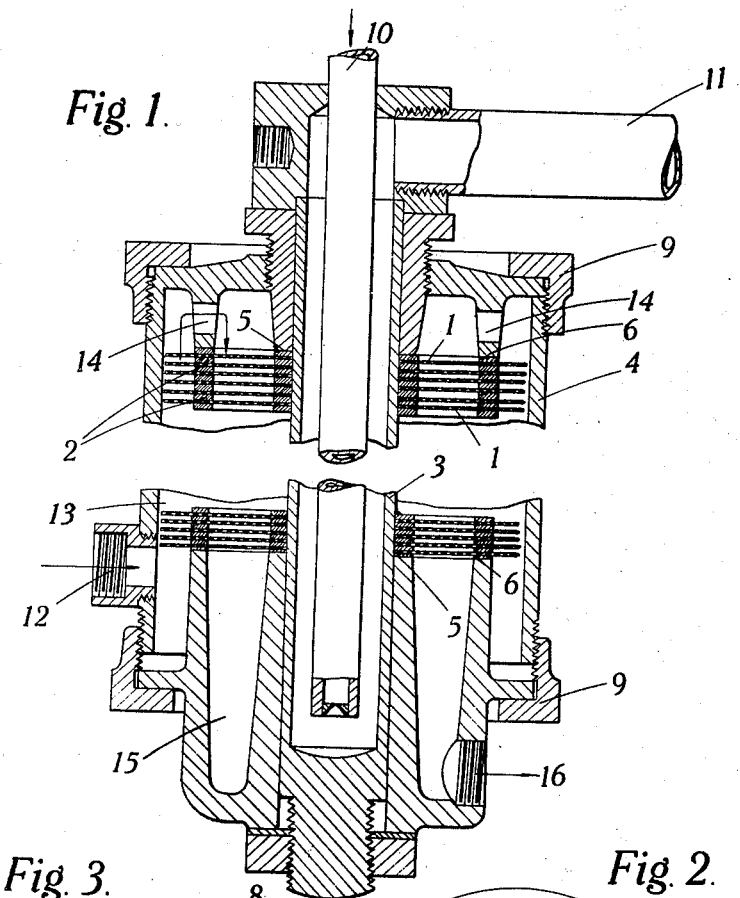
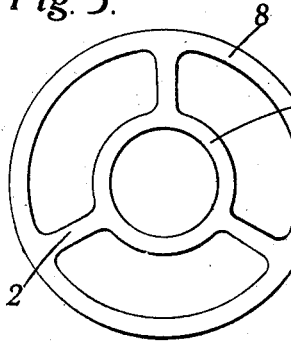
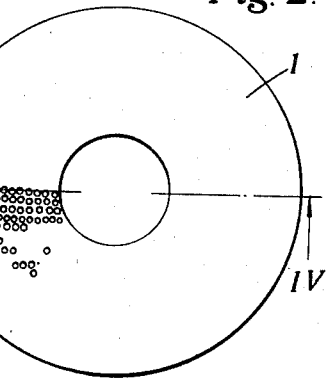
INVENTORS: Christopher Pleydell-Bouverie
Owen David Lucas
BY
ATTORNEY

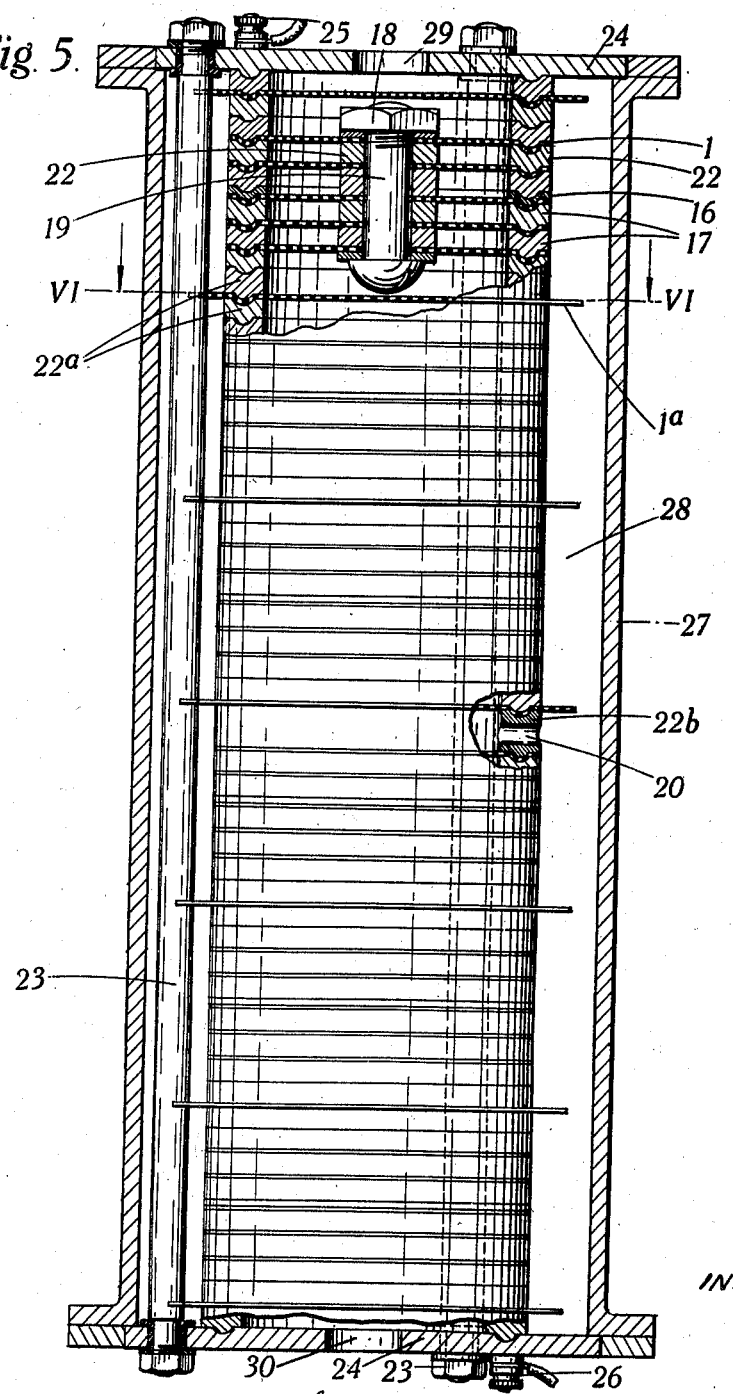

Patented Feb. 13, 1940

2,190,548

UNITED STATES PATENT OFFICE 2,190,548

CATALYTIC APPARATUS

Christopher Pleydell-Bouverie and Owen David Lucas, London, England, assignors to The Research Trust Limited, London, England, a corporation of Great Britain Application July 23, 1936, Serial No. 92,266
In Great Britain July 25, 1935

8 Claims. (Cl. 23—288)

This invention relates to the preparation and use of catalytic bodies and in particular to the preparation and use of catalyst supports.

It is common to use inert materials for supporting the catalysts required for carrying out certain reactions, keiselguhr, pumice and asbestos being particular examples of such materials. There are various objections to these materials. For example, they absorb water; they are bad conductors of heat; in some cases, they cause undesired reactions such as hydrolysis; further, at high temperatures, they may themselves become catalysts and promote results which are different from the desired results.

Metal supports or carriers have also been used in various different forms and are generally used in a form which provides a large superficial area, for example, in the form of wire gauze, shavings, turnings or balls. Tubes or plates arranged so as to provide tubular passages are sometimes used and it has been proposed to use perforated metal plates, although the applicants know of no actual user of such plates.

In general, a form of catalyst carrier was chosen which provided as large a surface area as possible. The applicants' researches have led them to the conclusion that the provision of a large superficial area is not the most important consideration. For example, a tube having a great length compared with its diameter provides a large superficial area but is by no means a really suitable catalyst carrier because a fluid passed through it will tend to flow in a streamline manner and the material forming the core of the stream may not come into contact with the catalyst at all or, at any rate, will come into contact with it for a much shorter time than the outer layer of the stream. The catalytic action is, in these circumstances, likely to be non-uniform and there is a very substantial risk that part of the material will be too strongly reacted and part of it too little reacted. The tube has the advantage, however, that the regularity of its surface enables the catalyst to be distributed uniformly over it. This, of course, assumes that the diameter is reasonably large. If irregularly shaped bodies such as turnings are used, there is little danger of stream-line flow occurring, but it is difficult to distribute the catalyst uniformly. Gauze is unsatisfactory because it is conducive to producing stream-line flow of the fluid passing through its meshes. Where perforated plates have been suggested, they have been thought of as the equivalent of gauze and, to the applicants' knowledge, there has never been any question as yet of perforating plates in a particular manner so as to enable a catalytic reaction to be carried out more uniformly than is possible with gauze.

The object of the invention is to make available apparatus for carrying out catalytic reactions on fluids in an exceedingly uniform manner. This is achieved by the use of catalyst carriers which can be readily and uniformly covered with the catalyst and which are such that each particle of the fluid under treatment is brought into contact with the catalyst for substantially the same length of time. Instead of aiming merely at providing as large an area of contact as possible between the fluid and the catalyst, the applicants aim at providing an apparatus in which the fluid is repeatedly brought into contact with the catalyst for short lengths of time and in which the particles of the fluid in contact with the catalyst are in movement relatively to each other.

The apparatus in accordance with the invention has catalyst carriers in the form of perforated metal plates mounted to form a stack. The fluid under treatment flows from one plate to another through the perforations and the size of the perforations and the thickness of the plates are so related that the flow through the perforations does not take place in a stream-line manner.

It has been found that plates having a thickness of about $\frac{1}{32}$" perforated with cylindrical holes of a diameter approximately equal to the thickness of the plates will, in general, give the desired effect. In order that the apparatus may have a reasonably high capacity, it is advisable to provide a very large number of holes, for example, so that the superficial area of the perforations accounts for from 30 to 50% of the superficial area of the plate.

The apparatus in accordance with the invention can be made particularly suitable for carrying out strongly exothermic catalytic reactions. The heat developed in such reactions is, of course, generated when the material under treatment comes into contact with the catalyst. As the catalyst is carried by metal plates, this heat is easily conveyed to and through these plates and if these plates are large enough to project out of the reaction chamber, they serve to conduct the exothermic heat rapidly to the outside. In the preferred form of construction, the perforated plate catalyst carriers are stacked with annular distance pieces between them. A tubular or annular reaction chamber is thus formed screened at intervals by the perforated plates. The plates project beyond the distance pieces to form fins which serve to dissipate the exothermic heat. These fins may be cooled in any suitable manner and in some cases it is advantageous to cool them with gases which are to be fed to the reaction chamber, these gases thus being pre-heated.

In order that the invention may be thoroughly understood and be more readily carried into effect, some examples of construction in accordance therewith will now be described with reference to the accompanying drawings, in which:

Figure 1 is a sectional elevation of a form of apparatus suitable for the catalytic conversion of naphthalene to phthallic anhydride.

Figure 2 shows one of the catalyst supports used in the arrangement of Figure 1.

Figure 3 is a view of a washer used for spacing the catalyst supports.

Figure 4 is a section to a larger scale on the line IV—IV in Figure 2.

Figure 5 is an elevation partly in section of a modified form of construction.

Figure 6:
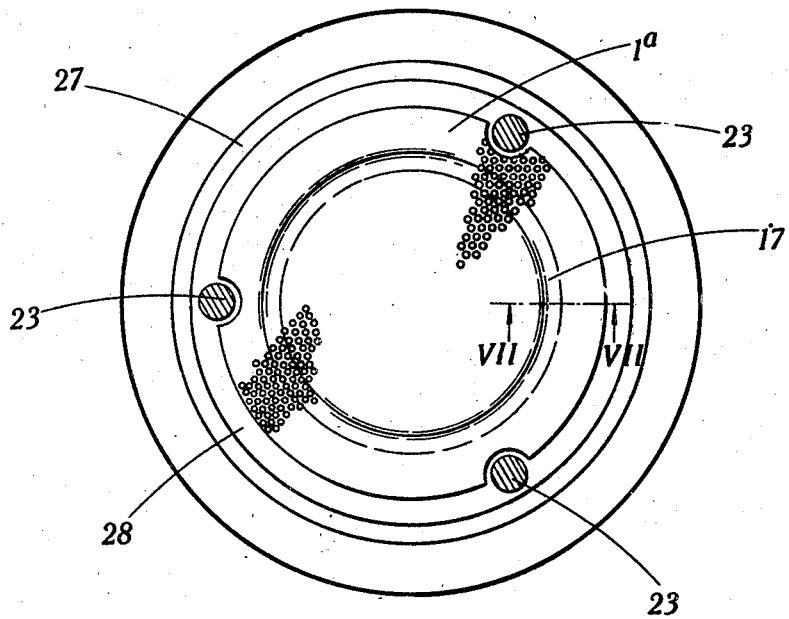
Figure 6 is a section on the line VI—VI in Figure 5.
Figure 7:
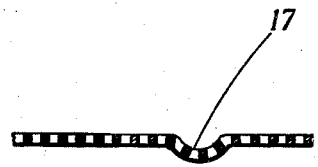
Figure 7 is a section to a larger scale taken on the line VII—VII in Figure 6.

In the arrangement of Figure 1, there is a nest of aluminium discs 1 perforated with small holes and separated by spacing washers 2 and strung on a tube 3. The tube 3 and the nest of catalyst supports and spacing washers are mounted within a casing 4 which, at its upper and lower ends, has concentric seatings 5 and 6. The spacing washers 2 are in the form of spiders (Figure 3), the inner rings 7 of the spiders coinciding with the inner seatings 5 and the outer rings 3 with the outer seatings 6. The various parts of the casing are held together by screw threaded members 9 so that the nest of catalyst supports and washers is held firmly and rigidly in position. The catalyst supports and the washers are both of aluminium in the particular case under consideration.

For the conversion of naphthalene to phthallic anhydride, vanadium oxide may be used as the catalyst and this may be applied to the catalyst supports 1 by dipping, spraying or by any other appropriate measure in the form of a solution of one of its salts which is then reduced in situ to its oxide. In order that the catalytic material may adhere well to the supports, the latter are first of all roughened. This may be done chemically, for example, by means of a strong alkali but preferably mechanically by sand blasting.

For carrying out the catalytic reaction, a starting temperature of the order of 300 to 450° C. is required and the apparatus is brought up to this temperature by the introduction through the central tube 10 of a heated fluid. This fluid emerges from the lower end of the tube 10 and flows upwards within the tube 3 and finally leaves through the tube 11. When the required temperature has been reached, the naphthalene vapour which is to be reacted is caused to enter together with air or other oxygen supplying gas through the inlet 12 and passes upwards through the apparatus in the annular space 13 surrounding the nest of catalyst supports and washers. At the top of this space 13, it passes through the openings 14 and then descends through the perforations in the catalyst supports into the lower annular space 15 and leaves the apparatus through the exit passage 16.

The reaction is strongly exothermic and difficulties have arisen in the past with regard to the dissipation of the excess heat. The most satisfactory method has been to immerse the reaction chamber in mercury which removes the exothermic heat by boiling. Also, it is usual to use from 5–10 times as much air as is theoretically necessary for the oxidation in order to slow down the oxidation to a suitable rate.

With the apparatus illustrated in the drawings, the exothermic heat is turned to useful account in a very simple manner. As can be seen, the catalyst supports are of larger diameter than the seatings 6 so that they project across the annular space 13, forming fins which will give up their heat to the naphthaline which enters through the inlet 12. The naphthalene vapour is thus pre-heated and the temperature of the reaction chamber maintained within the appropriate limits. If the cooling effect of the naphthalene is not sufficient, the apparatus can be jacketed with a cooling fluid or the space 13 be used as a jacket and the naphthalene be caused to enter the reaction space through the top of the casing. In the case of an endothermic reaction, the fins can be used as a means of heating the reaction chamber.

As stated above, it is usual to use from 5–10 times as much air as is theoretically necessary. It has, however, now been found that the reaction can be carried out satisfactorily using only a little more air than is theoretically necessary for oxidation if at the start of the process the air is fed to the reaction chamber together with an inert gas such as carbon dioxide. This use of an inert gas is a radical departure from normal practice. When the conversion process has been started, the reaction products withdrawn from the reaction chamber are treated, for example by scrubbing, for the recovery of the converted phthallic anhydride and the remainder of these products are then recycled together with fresh naphthalene and the amount of air which is required to provide the oxygen necessary for the oxidation process. This air can be admitted with the recycled products and the fresh naphthalene but is preferably admitted at intervals along the length of the reaction chamber so as to avoid excessive reaction at any one point. The oxidation system may be connected without intermediate cooling to apparatus for catalytically converting the phthallic anhydride to benzine. The products from the latter apparatus are then treated for the removal of the benzine, for example by condensation or adsorption, and the remaining products, mainly carbon dioxide and nitrogen, are re-cycled as described above.

The catalyst supports may be about 4 inches in diameter and be about $\frac{1}{32}$ of an inch thick, and the spacing washers may be about $\frac{1}{16}$ of an inch thick. The diameter is not in itself of very great importance but a certain amount of care has to be taken in choosing the correct spacing of the catalyst supports from each other, the thickness of the metal from which the supports are made and the diameter of the perforations. This is because, as already stated, it is desirable that the flow of fluid through the catalyst supports should be as turbulent as possible. It has been found that good results from this point of view can be obtained if the diameter of the perforations in the catalyst supports is about the same as the thickness of the sheet material and if the distance between successive catalyst supports is from 2 to 10 times the thickness of the sheet. It is also to be noted that the edges of the perforations should be as sharp as possible in order to ensure turbulent flow. Finally, in order to provide as large a contact surface as possible, the perforations should be as close as is practicable to each other.

The apparatus shown in Figure 5 is arranged so as to be heated electrically. It is built up of a number of sections comprising a number of superimposed catalyst supports 1 and spacing washers. Each catalyst support 1 is separated from the next by a pair of spacing washers 22 and an asbestos washer 16 is arranged between the second pair of washers and the third catalyst support. The catalyst supports 1, the outer spacing washers 22 and the asbestos washers 16 have concentric grooves 17 which serve as registering grooves and the elements of each section are held together by means of a central nut and bolt 18, 19. A number of these sections are superimposed on each other to form a tubular structure, the various sections being separated from each other by a pair of spacing washers 22a placed one on each side of a catalyst support 1a. The catalyst support 1a is of larger diameter than the remaining catalyst supports and projects outside the tubular structure so as to form a radiating fin for dissipating excess heat in the case of an exothermic reaction. Any number of such fins may be provided according to requirements. At intervals, a thicker spacing washer 22b can be used which is provided with a lateral hole 20 serving for the introduction of a pyrometer to test the temperature within the apparatus.

The whole arrangement can be clamped to form a rigid piece of apparatus by three rods 23 passing through suitable holes in the top and bottom plates 24.

As stated above, the arrangement shown in Figure 5 is electrically heated. The top plate 24 is provided with a terminal 25 through which it is connected to a source of alternating or direct current. The plate 24 is electrically insulated from the bolts 23. The current passes through the adjacent outer washers 22 and the catalyst supports until it reaches the insulating asbestos washer 16. It is then forced to flow through the catalyst supports in the upper half of the section to the central bolt 19 which, in the present case, is also made of aluminium, whence it flows to the catalyst support immediately beneath the asbestos washer and thence through the various catalyst supports and washers until the next asbestos washer is encountered. The lowermost washer 2 is provided with a terminal 26 through which the circuit is completed. The electrical connections could, of course, be made to the washers themselves.

In the case of a strongly exothermic reaction where there is a good deal of heat to dissipate, the whole arrangement may be mounted in a casing 27 which provides an annular space or jacket 28 through which a cooling fluid can be passed. The substance to be reacted can be passed directly into the tubular structure through the opening 29 in the top plate 24 and be removed through a similar opening 30 in the bottom plate 24. Alternatively, it can be introduced laterally through openings formed in one or more of the washers which, for this purpose, can be made of increased depth.

In the examples which have been described above, the various catalyst supports and washers are stated to be made of aluminium. Aluminium is the preferred material of which these washers are made because it is inert with respect to most of the common catalytic reactions and, moreover, because it allows spent catalysts to be removed from the supports by means of nitric acid without damaging the support itself. The invention, however, is not limited to the use of aluminium and, in general, any metal which is inert in the circumstances in which it is to be used is suitable. In some cases, the fact that the material of which the support is made is not inert with respect to the reaction or is attacked by the substance which is used for removing the spent catalyst from it is not to be considered as a disadvantage. For example, nickel is a good catalyst for carrying out a hydrogenation reaction. In this case, a perforated nickel sheet could be used and, from time to time, be treated with nitric acid to remove the spent superficial layers. This would result in nickel nitrate being formed on the carrier which, on being heated, can be converted to nickel oxide which may then be reduced by hydrogen to the metallic state.

Where the heating is effected electrically, the washers and rivets which are used for holding and spacing the catalyst supports may advantageously be made of copper because of the greater electrical conductivity and higher melting point of this material compared with aluminium. This advantage counterbalances the disadvantage that the presence of copper may have a somewhat detrimental effect on the reaction, particularly as the surface of the copper parts which is exposed to the reagents is extremely small compared with the effective surface of the perforated catalyst support. To reduce this disadvantage, the copper parts could, of course, be protected with suitable coatings, for example, of heat resisting enamel, paint or plating.

It has been found that perforated sheet in accordance with the invention can be made to carry as much as 10% of its weight as catalyst and that the space-time yield of a catalytic system built up in accordance with the invention can be many times as great as has hitherto been obtainable.

We claim:

1. Apparatus for carrying out catalytic reactions comprising a plurality of catalyst supports in the form of perforated metal discs, the perforations in each of said discs accounting for from 30 to 50% of the superficial area thereof, an impervious annular element interposed between each of said supports and the next near the periphery of said supports, an impervious annular element interposed between each of said supports and the next near the centre of said supports, said supports and said annular elements being concentric with each other, and means for retaining said supports and said annular elements in the form of a rigid pile, said means including interfitting annular ridges and grooves formed in said discs and said first named annular elements.

2. Apparatus as claimed in claim 1 wherein said pile comprises a plurality of groups of said supports and said elements, each of said groups being removable and replaceable as a single unit, and means connecting the supports of each group together.

3. Apparatus as claimed in claim 1 comprising at least one catalyst support of larger diameter than said larger annular elements.

4. Apparatus for carrying out catalystic reactions on fluids comprising a cylindrical outer casing, a cylindrical casing disposed within said outer casing, a passage connecting the interior of said inner to the interior of said outer casing, a plurality of perforated metal plates arranged across said inner casing, the edges of said plates projecting out of said inner casing into said outer casing, and an inlet for the fluid to be reacted provided in said outer casing at a point from which said fluid must contact with said edges of said plates before passing through said passage into said inner chamber and the perforations in said plates accounting for from 30 to 50% of the superficial area of said plates.

5. Apparatus for carrying out catalytic reactions on fluids comprising a central tube having imperforate walls, a plurality of perforated discs strung on said tube, a set of spacing washers disposed between said discs and having an internal diameter substantially equal to the external diameter of said tube, a further set of impervious spacing washers disposed between said discs and having an external diameter smaller than the diameter of said discs, a casing surrounding said tube, discs and washers and an inlet and an outlet in said casing for the fluid to be reacted disposed so as to constrain said fluid to travel parallel to the axis of said tube and the perforations in said discs accounting for from 30 to 50% of the superficial area of said discs.

6. Apparatus for carrying out catalytic reactions on fluids comprising a plurality of units each comprising a plurality of perforated metal discs formed with perforations having a diameter approximately equal to the thickness of said discs, a rod passing through said discs coaxially therewith, an inner spacing washer on said rod between successive discs, an outer spacing washer having an outer diameter not substantially greater than the outer diameter of said discs and an inner diameter substantially greater than the outer diameter of said inner spacing washers, an outer spacing washer being disposed between successive discs, annular deformations in said discs and outer washers adapted to insure registration of said discs and outer washers and to preclude relative lateral movement thereof, and means for securing said assembly of discs and washers to said rod, said units being superimposed on each other, a washer having the characteristics of said outer washers being disposed between the first disc in one unit and the last disc in the next unit.

7. Apparatus for carrying out catalytic reactions on fluids comprising a cylindrical outer casing, a cylindrical casing disposed within said outer casing, a passage connecting the interior of said inner to the interior of said outer casing, a plurality of perforated metal plates arranged across said inner casing, the edges of said plates projecting out of said inner casing into said outer casing, and an inlet for the fluid to be reacted provided in said outer casing at a point from which said fluid must contact with said edges of said plates before passing through said passage into said inner chamber.

8. Apparatus for carrying out catalytic reactions on fluids comprising a central tube having imperforate walls, a plurality of perforated discs strong on said tube, a set of spacing washers disposed between said discs and having an internal diameter substantially equal to the external diameter of said tube, a further set of impervious spacing washers disposed between said discs and having an external diameter smaller than the diameter of said discs, a casing surrounding said tube, discs and washers, and an inlet and an outlet for the fluid to be reacted disposed so as to constrain said fluid to travel parallel to the axis of said tube.

CHRISTOPHER PLEYDELL-BOUVERIE.
OWEN DAVID LUCAS.